United States Patent
Cruz-Hernandez et al.

(10) Patent No.: US 9,746,923 B2
(45) Date of Patent: Aug. 29, 2017

(54) SYSTEMS AND METHODS FOR PROVIDING FEATURES IN A FRICTION DISPLAY WHEREIN A HAPTIC EFFECT IS CONFIGURED TO VARY THE COEFFICIENT OF FRICTION

(75) Inventors: Juan Manuel Cruz-Hernandez, Montreal (CA); Danny A. Grant, Laval (CA)

(73) Assignee: Immersion Corporation, San Jose, CA (US)

( * ) Notice: Subject to any disclaimer, the term of this patent is extended or adjusted under 35 U.S.C. 154(b) by 1174 days.

(21) Appl. No.: 12/696,893

(22) Filed: Jan. 29, 2010

(65) Prior Publication Data

US 2010/0231367 A1    Sep. 16, 2010

Related U.S. Application Data

(60) Provisional application No. 61/159,482, filed on Mar. 12, 2009, provisional application No. 61/262,041, (Continued)

(51) Int. Cl.
*G08B 21/00* (2006.01)
*G06F 3/01* (2006.01)
*G06F 3/0488* (2013.01)

(52) U.S. Cl.
CPC .......... *G06F 3/016* (2013.01); *G06F 3/0488* (2013.01)

(58) Field of Classification Search
CPC ...................................................... G06F 3/06
(Continued)

(56) References Cited

U.S. PATENT DOCUMENTS 5,144,187 A   9/1992 Culp
5,198,732 A   3/1993 Morimoto
(Continued)

FOREIGN PATENT DOCUMENTS

CN    1882904    12/2006
CN    1983125    6/2007
(Continued)

OTHER PUBLICATIONS

Chowdhury, Mohammad Asaduzzaman, Maksud Helali. "The effect of amplitude of vibration on the coefficient of friction for different materials." Tribology International. vol. 41, issue 4 (Apr. 2008): 307-317.*

(Continued)

*Primary Examiner* — Jeffery Hofsass
(74) *Attorney, Agent, or Firm* — Kilpatrick Townsend & Stockton LLP

(57) ABSTRACT

A touch-enabled device can simulate one or more features in a touch area. Features may include, but are not limited to, changes in texture and/or simulation of boundaries, obstacles, or other discontinuities in the touch surface that can be perceived through use of an object in contact with the surface. Systems include a sensor configured to detect a touch in a touch area when an object contacts a touch surface, an actuator, and one or more processors. The processor can determine a position of the touch using the sensor and select a haptic effect to generate based at least in part on the position, the haptic effect selected to simulate the presence of a feature at or near the determined position. The processor can transmit a haptic signal to generate the identified haptic effect using the actuator. Some features are simulated by varying the coefficient of friction of the touch surface.

22 Claims, 9 Drawing Sheets

Related U.S. Application Data filed on Nov. 17, 2009, provisional application No. 61/262,038, filed on Nov. 17, 2009.

(58) Field of Classification Search
USPC ........... 340/4.1, 4.12, 407.1, 407.2; 116/205; 341/20–27, 34; 345/168–183
See application file for complete search history.

(56) References Cited

U.S. PATENT DOCUMENTS

| | | | |
|---|---|---|---|
| 5,691,898 | A | 11/1997 | Rosenberg et al. |
| 5,709,219 | A | 1/1998 | Chen et al. |
| 5,734,373 | A | 3/1998 | Rosenberg et al. |
| 5,767,839 | A | 6/1998 | Rosenberg et al. |
| 5,844,392 | A | 12/1998 | Peurach et al. |
| 5,939,816 | A | 8/1999 | Culp |
| 5,952,806 | A | 9/1999 | Muramatsu |
| 5,956,484 | A | 9/1999 | Rosenberg et al. |
| 5,959,613 | A | 9/1999 | Rosenberg et al. |
| 6,028,593 | A | 2/2000 | Rosenberg et al. |
| 6,046,527 | A | 4/2000 | Roopnarine et al. |
| 6,084,587 | A | 7/2000 | Tarr et al. |
| 6,088,019 | A | 7/2000 | Rosenberg |
| 6,131,097 | A | 10/2000 | Peurach et al. |
| 6,147,674 | A | 11/2000 | Rosenberg et al. |
| 6,169,540 | B1 | 1/2001 | Rosenberg et al. |
| 6,219,032 | B1 | 4/2001 | Rosenberg |
| 6,252,579 | B1 | 6/2001 | Rosenberg |
| 6,285,351 | B1 | 9/2001 | Chang et al. |
| 6,292,170 | B1 | 9/2001 | Chang et al. |
| 6,424,333 | B1 | 7/2002 | Tremblay et al. |
| 6,429,846 | B2 | 8/2002 | Rosenberg et al. |
| 6,433,711 | B1 | 8/2002 | Chen |
| 6,693,622 | B1 | 2/2004 | Shahoian et al. |
| 6,697,086 | B2 | 2/2004 | Rosenberg et al. |
| 6,703,924 | B2 * | 3/2004 | Tecu et al. ................. 340/407.1 |
| 6,850,222 | B1 | 2/2005 | Rosenberg et al. |
| 6,859,819 | B1 | 2/2005 | Rosenberg et al. |
| 7,027,032 | B2 | 4/2006 | Rosenberg et al. |
| 7,148,875 | B2 | 12/2006 | Rosenberg et al. |
| 7,161,580 | B2 | 1/2007 | Bailey et al. |
| 7,626,579 | B2 | 12/2009 | Hague et al. |
| 7,667,687 | B2 | 2/2010 | Cruz-Hernandez et al. |
| 7,812,828 | B2 * | 10/2010 | Westerman et al. .......... 345/173 |
| 7,815,436 | B2 | 10/2010 | Cunningham et al. |
| 7,890,863 | B2 | 2/2011 | Lacroix et al. |
| 7,920,124 | B2 | 4/2011 | Tokita et al. |
| 8,098,235 | B2 | 1/2012 | Heubel et al. |
| 8,157,650 | B2 | 4/2012 | Grant et al. |
| 8,210,942 | B2 | 7/2012 | Shimabukuro et al. |
| 8,232,969 | B2 | 7/2012 | Grant et al. |
| 9,448,713 | B2 | 9/2016 | Grant et al. |
| 2001/0035854 | A1 | 11/2001 | Rosenberg et al. |
| 2002/0017833 | A1 | 2/2002 | Montuschi et al. |
| 2002/0177471 | A1 | 11/2002 | Kaaresoja et al. |
| 2003/0063128 | A1 | 4/2003 | Salmimaa et al. |
| 2003/0184518 | A1 | 10/2003 | Numata et al. |
| 2004/0218910 | A1 | 11/2004 | Chang et al. |
| 2004/0233162 | A1 | 11/2004 | Kobayashi |
| 2005/0017947 | A1 * | 1/2005 | Shahoian et al. ............. 345/156 |
| 2005/0030292 | A1 | 2/2005 | Diederiks |
| 2005/0052430 | A1 | 3/2005 | Shahoian et al. |
| 2005/0057528 | A1 * | 3/2005 | Kleen ............................ 345/173 |
| 2006/0061545 | A1 | 3/2006 | Hughes et al. |
| 2006/0061558 | A1 | 3/2006 | Grant et al. |
| 2006/0119573 | A1 | 6/2006 | Grant et al. |
| 2006/0119586 | A1 | 6/2006 | Grant et al. |
| 2006/0181510 | A1 | 8/2006 | Faith |
| 2006/0209037 | A1 | 9/2006 | Wang et al. |
| 2006/0226298 | A1 | 10/2006 | Pierson |
| 2006/0267416 | A1 | 11/2006 | Suzuki |
| 2006/0288137 | A1 | 12/2006 | Grant et al. |
| 2006/0290662 | A1 | 12/2006 | Houston et al. |
| 2007/0021961 | A1 | 1/2007 | Oh et al. |
| 2007/0036450 | A1 | 2/2007 | Kondo et al. |
| 2007/0066283 | A1 | 3/2007 | Haar et al. |
| 2007/0069611 | A1 | 3/2007 | Lee |
| 2007/0236450 | A1 * | 10/2007 | Colgate et al. ............... 345/156 |
| 2007/0236474 | A1 | 10/2007 | Ramstein |
| 2007/0279401 | A1 | 12/2007 | Ramstein et al. |
| 2007/0290988 | A1 | 12/2007 | Nogami et al. |
| 2008/0048974 | A1 | 2/2008 | Braun et al. |
| 2008/0068348 | A1 | 3/2008 | Rosenberg et al. |
| 2008/0084384 | A1 | 4/2008 | Gregorio et al. |
| 2008/0117175 | A1 | 5/2008 | Linjama et al. |
| 2009/0102805 | A1 | 4/2009 | Meijer et al. |
| 2009/0134744 | A1 | 5/2009 | Yoon et al. |
| 2009/0207129 | A1 | 8/2009 | Ullrich et al. |
| 2009/0227296 | A1 | 9/2009 | Kim et al. |
| 2009/0284485 | A1 | 11/2009 | Colgate et al. |
| 2010/0020036 | A1 | 1/2010 | Hui et al. |
| 2010/0026976 | A1 | 2/2010 | Meehan et al. |
| 2010/0073304 | A1 | 3/2010 | Grant et al. |
| 2010/0108408 | A1 | 5/2010 | Colgate et al. |
| 2010/0231539 | A1 | 9/2010 | Cruz-Hernandez et al. |
| 2010/0315212 | A1 | 12/2010 | Radivojevic et al. |
| 2011/0115709 | A1 | 5/2011 | Cruz-Hernandez |
| 2011/0248817 | A1 | 10/2011 | Houston et al. |
| 2012/0232780 | A1 | 9/2012 | Delson et al. |

FOREIGN PATENT DOCUMENTS

| | | |
|---|---|---|
| CN | 102349039 | 2/2012 |
| CN | 102713793 | 10/2012 |
| CN | 106125973 | 11/2016 |
| EP | 0899 650 | 3/1999 |
| EP | 1 401 185 | 3/2004 |
| EP | 1 731 993 | 12/2006 |
| EP | 1748350 | 1/2007 |
| GB | 2 416 962 | 2/2006 |
| JP | 11212725 | 8/1999 |
| JP | 2001-290572 A | 10/2001 |
| JP | 2003-099177 A | 4/2003 |
| JP | 2003199974 | 7/2003 |
| JP | 2004-310518 A | 11/2004 |
| JP | 5668076 | 2/2015 |
| JP | 2015130183 | 7/2015 |
| KR | 1020080092482 | 10/2008 |
| WO | 02/073587 A1 | 9/2002 |
| WO | WO 2004/044728 | 5/2004 |
| WO | 2004081776 | 9/2004 |
| WO | WO 2004/075169 | 9/2004 |
| WO | WO 2005/103863 | 11/2005 |
| WO | WO 2007117418 | 10/2007 |
| WO | 2008037275 | 4/2008 |
| WO | WO 2008/132540 | 11/2008 |
| WO | WO 2009/074185 | 6/2009 |
| WO | 2009/097866 A1 | 8/2009 |

OTHER PUBLICATIONS

Corel Paint Shop Pro Photo X2 Reviewer's Guide, Copyright 2007, web page at http://web.archive.org/web/20071102133023/http://www.corel.com/conte nt!vpk!psppx2/PS P PX2Reviewer_Guide.pdf, as available via the Internet and accessed Apr. 7, 2012.

Search Report and Written Opinion mailed Jun. 8, 2010 for corresponding PCT Application No. PCT/US2010/026909.

Search Report and Written Opinion mailed Jun. 8, 2010 for corresponding PCT Application No. PCT/US2010/026897.

Search Report and Written Opinion mailed Jun. 8, 2010 for corresponding PCT Application No. PCT/US2010/026905.

Search Report and Written Opinion mailed Jun. 8, 2010 for corresponding PCT Application No. PCT/US2010/026894.

Search Report and Written Opinion mailed Jun. 8, 2010 for corresponding PCT Application No. PCT/US2010/026907.

Search Report and Written Opinion mailed Jun. 8, 2010 for corresponding PCT Application No. PCT/US2010/026900.

Biet, M. et al., "Discrimination of Virtual Square Gratings by Dynamic Touch on Friction Based Tactile Displays," Haptic Interfaces for Virtual Environment and Teleoperator Systems, 2008, Symposium, IEEE, Piscataway, NJ, XP 031339918, pp. 41-48, Mar. 2008.

(56) References Cited

OTHER PUBLICATIONS

De Witt, A., "Designing Sonification of User Data in Affective Interaction," Master of Science Thesis Stockholm, Sweden, XP 002551466, at hppt://w3.nada.kth.se/utbildning/grukth/exjobb/rap-portlistor/2007/de_witt_anna_07142, as available via the Internet and printed Oct. 20, 2009.
Kaaresoja, T. et al., "Snap-Crackle-Pop: Tactile Feedback for Mobile Touch Screens," Proceedings of the Eurohaptics 2006, XP 002551465, at http://lsc.univ-evry.fr/(eurohaptics/upload/cd/papers/f80, as available via the Internet and printed Oct. 20, 2009.
Maeno, T. et al., "Tactile Display of Surface Texture by use of Amplitude Modulation of Ultrasonic Vibration," IEEE Ultrasonics Symposium, 2006, pp. 62-65.
Minsky, Margaret Diane Rezvan, "Computational Haptics: The Sandpaper System for Synthesizing Texture for a Force-Feedback Display," Ph.D. Dissertation, Massachusetts Institute of Technology, Jun. 1995, 217 pages.
Oakley, I. et al., Contact IM: Exploring Asynchronous Touch over Distance, Palpable Machines Research Group, Media Lab Europe, XP 007910188, at http://people.cs.vt.edu/[wangr06/touch%20review%origization/OAK002, as available via the Internet and printed Oct. 20, 2009.
Rovers, A. et al., HIM: A Framework for Haptic Instant Messaging, CHI 2004 (CHI Conference Proceedings, Human Factors in Computing Systems), XP 002464573, Vienna Austria, Apr. 2004, p. 1313-1316.
Sekiguchi, Y. et al., "Haptic Interface using Estimation of Box Contents Metaphor," Proceedings of ICAT 2003, Tokyo, Japan, XP 002551467, at http://www.vrsj.org/ic-at/papers/2003/00947_00000, as available via the Internet and printed Oct. 20, 2009.
Watanabe, T. et al., "A Method for Controlling Tactile Sensation of Surface Roughness Using Ultrasonic Vibration," IEEE International Conference on Robotics and Automation, 0-7803-1965-6/95, 1995, pp. 1134-1139.
Williamson, J. et al., "Shoogle: Excitatory Multimodal Interaction on Mobile Devices," CHI 2007 Proceedings—Shake, Rattle and Roll: New Forms of Input and Output, 2007, pp. 121-124, XP002549378.
International Preliminary Report on Patentability mailed Sep. 22, 2011 for corresponding International Application No. PCT/US2010/026909.
International Preliminary Report on Patentability mailed Sep. 22, 2011 for corresponding International Application No. PCT/US2010/026897.
International Preliminary Report on Patentability mailed Sep. 22, 2011 for corresponding International Application No. PCT/US2010/026905.
International Preliminary Report on Patentability mailed Sep. 22, 2011 for corresponding International Application No. PCT/US2010/026894.
International Preliminary Report on Patentability mailed Sep. 22, 2011 for corresponding International Application No. PCT/US2010/026907.
International Preliminary Report on Patentability mailed Sep. 22, 2011 for corresponding International Application No. PCT/US2010/026900.
Office Action dated Nov. 2, 2012 for corresponding U.S. Appl. No. 12/947,321.
Chowdhury, M.A. et al., "The Effect of Amplitude of Vibration on the Coefficient of Friction for Different Materials," Tribology International, 2008, 41:307-314.
Tang, H. et al., "A Microfabricated Electrostatic Haptic Display for Persons with Visual Impairments," IEEE Transactions on Rehabilitation Engineering, Sep. 1998, 6(3):241-314.
Office Action mailed Nov. 15, 2012 for corresponding U.S. Appl. No. 12/947,532.
Office Action mailed Jan. 15, 2013 for corresponding U.S. Appl. No. 12/696,908.
Office Action mailed Jan. 15, 2013 for corresponding U.S. Appl. No. 12/697,037.
Office Action mailed Jan. 15, 2013 for corresponding U.S. Appl. No. 12/696,900.
United States Patent and Trademark Office, Office Action, U.S. Appl. No. 12/696,900 dated Oct. 28, 2016, 3 pages.
United States Patent and Trademark Office, Office Action, U.S. Appl. No. 12/696,900, dated Aug. 19, 2016, 11 pages.
United States Patent and Trademark Office, Office Action, U.S. Appl. No. 12/696,900, dated Dec. 12, 2016, 11 pages.
United States Patent and Trademark Office, Office Action, U.S. Appl. No. 12/696,900, dated May 9, 2016, 12 pages.
United States Patent and Trademark Office, Office Action, U.S. Appl. No. 12/696,908, dated Nov. 10, 2016, 14 pages.
United States Patent and Trademark Office, Office Action, U.S. Appl. No. 12/696,908, dated May 26, 2016, 14 pages.
United States Patent and Trademark Office, Office Action, U.S. Appl. No. 12/696,908, dated Mar. 27, 2012, 24 pages.
United States Patent and Trademark Office, Office Action, U.S. Appl. No. 12/697,010, dated Dec. 7, 2016, 3 pages.
United States Patent and Trademark Office, Office Action, U.S. Appl. No. 12/697,010, dated Sep. 16, 2016, 18 pages.
United States Patent and Trademark Office, Office Action, U.S. Appl. No. 12/697,010, dated May 20, 2016, 12 pages.
United States Patent and Trademark Office, Office Action, U.S. Appl. No. 12/697,010, dated Apr. 11, 2012, 22 pages.
United States Patent and Trademark Office, Office Action, U.S. Appl. No. 12/697,010, dated Jan. 18, 2013, 15 pages.
United States Patent and Trademark Office, Office Action, U.S. Appl. No. 12/697,037, dated Jun. 6, 2016, 14 pages.
United States Patent and Trademark Office, Office Action, U.S. Appl. No. 12/697,037, dated Apr. 12, 2012, 38 pages.
United States Patent and Trademark Office, Office Action, U.S. Appl. No. 12/697,042, dated Nov. 30, 2016, 20 pages.
United States Patent and Trademark Office, Office Action, U.S. Appl. No. 12/697,042, dated May 17, 2016, 43 pages.
United States Patent and Trademark Office, Office Action, U.S. Appl. No. 12/697,042, dated Apr. 2, 2012, 21 pages.
United States Patent and Trademark Office, Office Action, U.S. Appl. No. 12/697,042, dated Feb. 5, 2013, 46 pages.
United States Patent and Trademark Office, Office Action, U.S. Appl. No. 12/947,321, dated Apr. 3, 2014, 29 pages.
United States Patent and Trademark Office, Office Action, U.S. Appl. No. 12/947,321, dated Mar. 18, 2013, 30 pages.
United States Patent and Trademark Office, Office Action, U.S. Appl. No. 12/947,321, dated Oct. 9, 2013, 23 pages.
United States Patent and Trademark Office, Office Action, U.S. Appl. No. 12/947,532, dated Mar. 11, 2014, 17 pages.
United States Patent and Trademark Office, Office Action, U.S. Appl. No. 12/947,532, dated Mar. 12, 2013, 19 pages.
United States Patent and Trademark Office, Office Action, U.S. Appl. No. 12/947,532, dated Sep. 27, 2013, 14 pages.
United States Patent and Trademark Office, Office Action, U.S. Appl. No. 12/947,532, dated Sep. 9, 2016, 26 pages.
The State Intellectual Property Office of the Peoples Republic of China, Notification of Second Office Action, Application No. CN201080011744.3 dated Jun. 24, 2014, 13 pages.
The State Intellectual Property Office of the Peoples Republic of China, Notification of First Office Action, Application No. CN201080011744.3 dated Aug. 12, 2015, 6 pages.
The State Intellectual Property Office of the Peoples Republic of China, Notification of First Office Action, Application No. CN201080011744.3 dated Dec. 16, 2014, 7 pages.
The State Intellectual Property Office of the Peoples Republic of China, Notification of First Office Action, Application No. CN201080011744.3 dated Sep. 23, 2013, 8 pages.
The State Intellectual Property Office of the Peoples Republic of China, Notification of First Office Action, Application No. CN201080051254.6 dated Jun. 13, 2014, 11 pages.
The State Intellectual Property Office of the Peoples Republic of China, Notification of Third Office Action, Application No. CN201080051254.6 dated Jul. 2, 2015, 12 pages.
The State Intellectual Property Office of the Peoples Republic of China, Notification of Fourth Office Action, Application No. CN201080051254.6 dated Dec. 31, 2015, 3 pages.

(56) References Cited

OTHER PUBLICATIONS

The State Intellectual Property Office of the Peoples Republic of China, Notification of Second Office Action, Application No. CN201080051254.6 dated Nov. 27, 2014, 7 pages.
Japanese Patent Office, Notice of Reasons for Rejection, Application No. JP2011-554172 dated Jan. 28, 2014, 3 pages.
Japanese Patent Office, Notice of Reasons for Rejection, Application No. JP2012-539970 dated Apr. 1, 2014, 3 pages.
Japanese Patent Office, Notice of Reasons for Rejection, Application No. JP2015-019308 dated Mar. 1, 2016, 4 pages.
Korean Patent Office, Notice of Preliminary Rejection, Application No. KR10-2011-7023987 dated Apr. 27, 2016.
Korean Patent Office, Notice of Preliminary Rejection, Application No. KR10-2011-7023987 dated Aug. 21, 2015.
Korean Patent Office, Notice of Preliminary Rejection, Application No. KR10-2012-7015581 dated Apr. 12, 2016.
Korean Patent Office, Notice of Last Preliminary Rejection, Application No. 10-2011-7023987 dated Nov. 29, 2016.
United States Patent and Trademark Office, Office Action, U.S. Appl. No. 12/697,037 dated Jan. 17, 2017.
United States Patent and Trademark Office, Office Action, U.S. Appl. No. 12/947,532 dated Feb. 2, 2017.
United States Patent and Trademark Office, Office Action, U.S. Appl. No. 12/697,010 dated Feb. 22, 2017.
European Patent Office Application No. 10712198.0, Office Action dated Feb. 27, 2017, 5 pages.
Japanese Patent Office Application No. 2015-083829, Notice of Decision to Grant dated Feb. 7, 2017, 3 pages.
Japanese Patent Office Application No. 2015-083829, Office Action dated Nov. 8, 2016, 2 pages.
Japanese Patent Office Application No. 2015-083829, Office Action dated Jun. 21, 2016, 3 pages and translation 3 pages.
U.S. Appl. No. 12/696,908, Non Final Office Action dated Mar. 31, 2017.
U.S. Appl. No. 12/947,532, Non-Final Office Action dated May 23, 2017.
Chakrabarti et al., "Rendering Color Information using Haptic Feedback", University of British Columbia CS Technical Report, Retrieved from httpsilvvww.c.s.ubc.calcgi-binttri2004flR-2004-, Jul. 22, 2004, 10 pages.
Korean Patent Office Application No. 10-2016-7024778, Office Action dated Apr. 28, 2017.

* cited by examiner

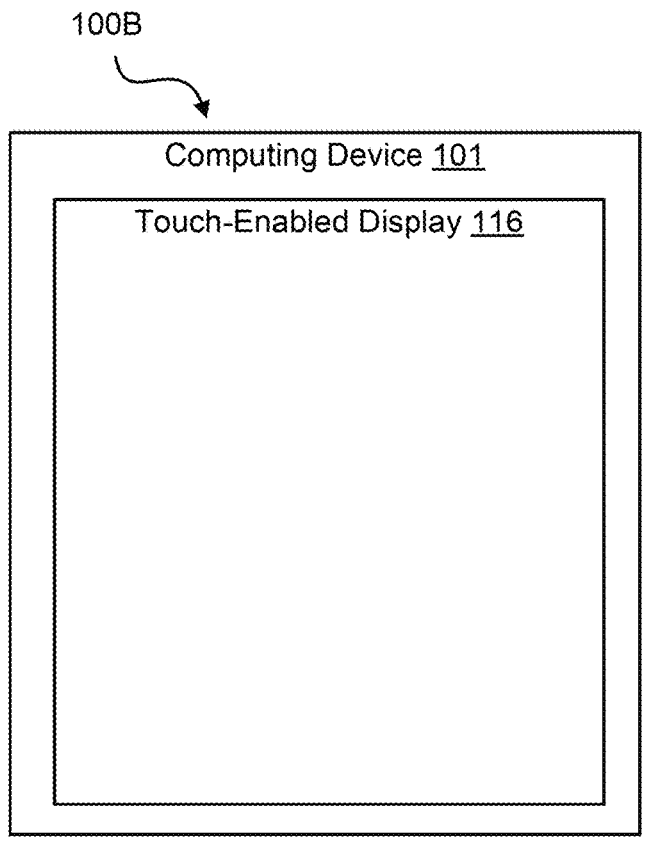
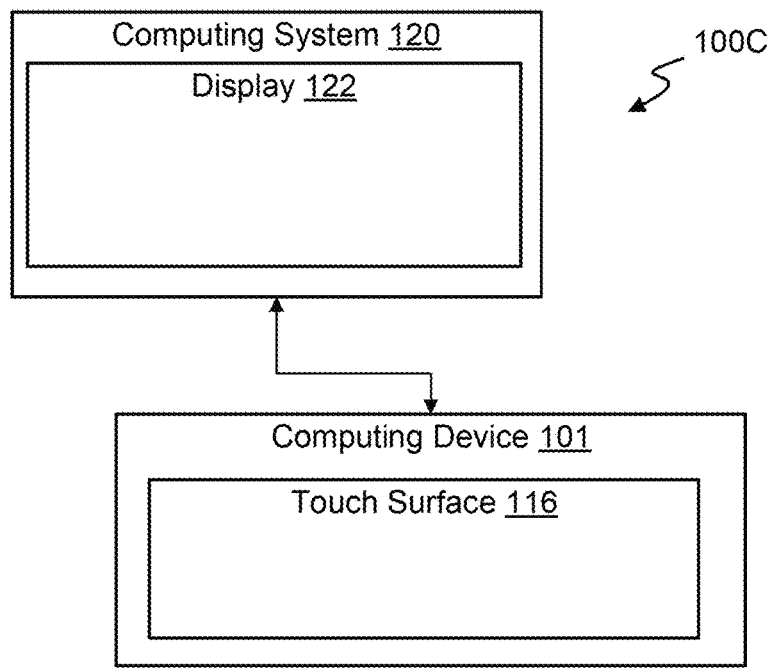

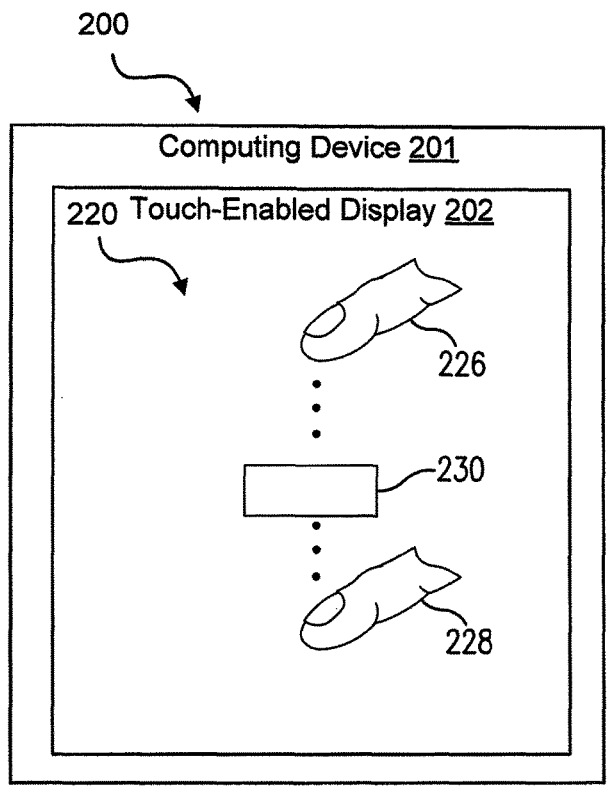
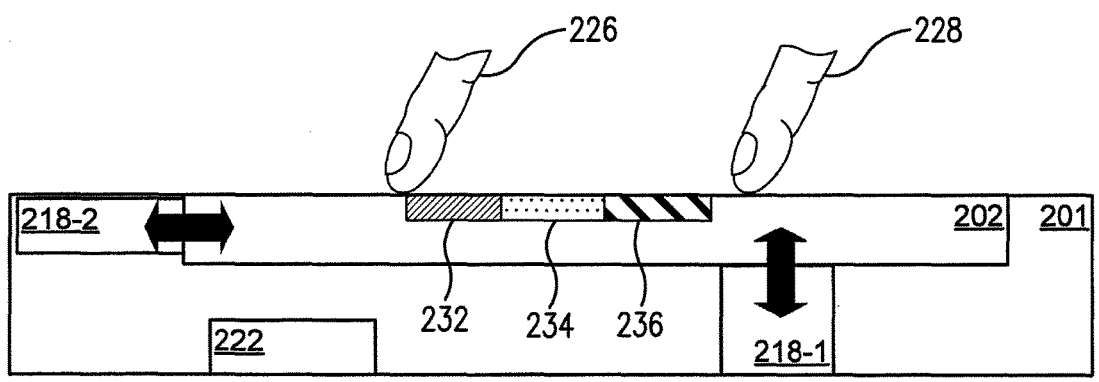
Figure 2A
Figure 2B

SYSTEMS AND METHODS FOR PROVIDING FEATURES IN A FRICTION DISPLAY WHEREIN A HAPTIC EFFECT IS CONFIGURED TO VARY THE COEFFICIENT OF FRICTION

CROSS-REFERENCE TO RELATED APPLICATIONS

This patent application claims priority to U.S. Provisional Patent Application No. 61/159,482, entitled "Locating Features Using a Friction Display," filed Mar. 12, 2009, which is incorporated by reference herein in its entirety.

This patent application claims priority to U.S. Provisional Patent Application No. 61/262,041, entitled "System and Method for Increasing Haptic Bandwidth in an Electronic Device" filed Nov. 17, 2009, which is incorporated by reference herein in its entirety.

This patent application claims priority to U.S. Provisional Patent Application No. 61/262,038, entitled "Friction Rotary Device for Haptic Feedback" filed Nov. 17, 2009, which is incorporated by reference herein in its entirety.

This patent application is related to U.S. patent application Ser. No. 12/697,010, filed the same day as the present application and entitled "Systems and Methods for a Texture Engine," which is incorporated by reference herein in its entirety.

This patent application is related to U.S. patent application Ser. No. 12/697,042, filed the same day as the present application and entitled "Systems and Methods for Using Multiple Actuators to Realize Textures," which is incorporated by reference herein in its entirety.

This patent application is related to U.S. patent application Ser. No. 12/697,037, filed the same day as the present application and entitled "Systems and Methods for Using Textures in Graphical User Interface Widgets," which is incorporated by reference herein in its entirety.

This patent application is related to U.S. patent application Ser. No. 12/696,900, filed the same day as the present application and entitled "Systems and Methods for Providing Features in a Friction Display," which is incorporated by reference herein in its entirety.

This patent application is related to U.S. patent application Ser. No. 12/696,908, filed the same day as the present application and entitled "Systems and Methods for Interfaces Featuring Surface-Based Haptic Effects," which is incorporated by reference herein in its entirety.

BACKGROUND

Touch-enabled devices have been increasingly popular. For instance, mobile and other devices may be configured with touch-sensitive displays so that a user can provide input by touching portions of the touch-sensitive display. As another example, a touch-enabled surface separate from a display may be used for input, such as a trackpad, mouse, or other device.

For example, a user may touch a portion of the display or surface that is mapped to an on-screen graphical user interface, such as a button or control. As another example, a gesture may be provided, such as a sequence of one or more touches, drags across the surface, or other recognizable patterns sensed by the device. Although touch-enabled displays and other touch-based interfaces have greatly enhanced device functionality, drawbacks remain. For instance, even if a keyboard is displayed on a screen, a user accustomed to a physical keyboard may not have the same experience while using the touch-enabled device.

SUMMARY

Embodiments of the present invention include devices featuring surface-based haptic effects that simulate one or more features in a touch area. Features may include, but are not limited to, changes in texture and/or simulation of boundaries, obstacles, or other discontinuities in the touch surface that can be perceived through use of an object in contact with the surface. Devices including surface-based haptic effects may be more user friendly and may provide a more compelling user experience.

In one embodiment, a system includes a sensor configured to detect a touch in a touch area when an object contacts a touch surface, an actuator, and one or more processors. The touch area may correspond to a display area and/or another surface with which a user interacts via an object such as a finger or pen. The processor can be configured to determine a position of the touch based on data from the sensor and select a haptic effect to generate based at least in part on the position, the haptic effect selected to simulate the presence of a feature at or near the determined position. Further, the processor can transmit a haptic signal to generate the identified haptic effect using the actuator. The actuator can be coupled to the touch surface and can be configured to receive a haptic signal generated by the processor and output a haptic effect in response. In some embodiments, selecting the haptic effect comprises determining a variation in the coefficient of friction that will simulate the presence of the feature at or near the determined position.

These illustrative embodiments are mentioned not to limit or define the limits of the present subject matter, but to provide examples to aid understanding thereof. Illustrative embodiments are discussed in the Detailed Description, and further description is provided there. Advantages offered by various embodiments may be further understood by examining this specification and/or by practicing one or more embodiments of the claimed subject matter.

BRIEF DESCRIPTION OF THE DRAWINGS

A full and enabling disclosure is set forth more particularly in the remainder of the specification. The specification makes reference to the following appended figures.

FIG. 1B shows an external view of one embodiment of the system shown in FIG. 1A.

FIG. 1C illustrates an external view of another embodiment of the system shown in FIG. 1A.

FIGS. 2A-2B illustrate an example of simulating a feature using a surface-based haptic effect.

DETAILED DESCRIPTION

Reference will now be made in detail to various and alternative illustrative embodiments and to the accompanying drawings. Each example is provided by way of explanation, and not as a limitation. It will be apparent to those skilled in the art that modifications and variations can be made. For instance, features illustrated or described as part of one embodiment may be used on another embodiment to yield a still further embodiment. Thus, it is intended that this disclosure include modifications and variations as come within the scope of the appended claims and their equivalents.

Illustrative Example of a Device Using a Variable Friction Interface

One illustrative embodiment of the present invention comprises a computing system such as an iPod® portable music device or iPhone® mobile device, both available from Apple Inc. of Cupertino, Calif., or a Zune® portable device, available from Microsoft Corporation of Redmond, Wash. The computing system can include and/or may be in communication with one or more sensors, such as an accelerometer, as well as sensors (e.g., optical, resistive, or capacitive) for determining a location of a touch relative to a display area corresponding in this example to the screen of the device.

As the user interacts with the device, one or more actuators are used to provide tactile effects. For example, as a user moves a finger across the device, the coefficient of friction of the screen can be varied based on the position, velocity, and/or acceleration of the finger. Depending on how the friction is varied, the user may perceive a feature in the touch surface that would not otherwise be perceived in the same manner (or at all) if the surface friction were not varied. As a particular example, the friction may be varied so that the user perceives a bump, border, or other obstacle corresponding to an edge of an on-screen button. As will be discussed in further detail below, varying the coefficient of friction can be used in any number of ways to provide information to a user. Additionally, the presence of a feature in the touch surface can be simulated using effects in addition to or instead of varying the coefficient of friction.

Figure 1A:
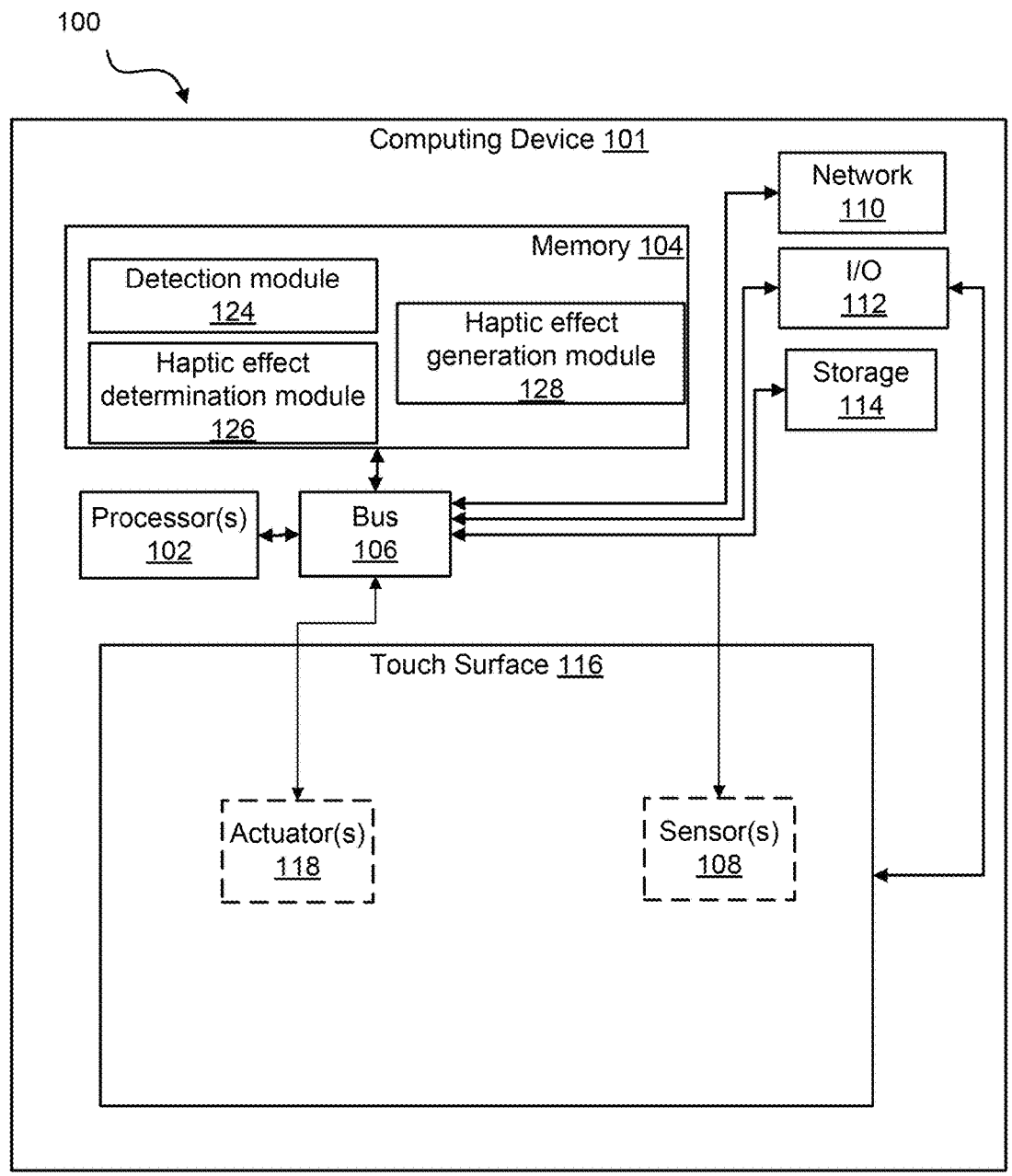
FIG. 1A shows an illustrative system for providing surface-based haptic effects.

Illustrative Systems for Simulating Features by Providing Surface-Based Haptic Effects FIG. 1A shows an illustrative system 100 for providing a surface-based haptic effect. Particularly, in this example, system 100 comprises a computing device 101 featuring a processor 102 interfaced with other hardware via bus 106. A memory 104, which can comprise any suitable tangible (and non-transitory) computer-readable medium such as RAM, ROM, EEPROM, or the like, embodies program components that configure operation of the computing device. In this example, computing device 101 further includes one or more network interface devices 110, input/output (I/O) interface components 112, and additional storage 114.

Network device(s) 110 can represent any components that facilitate a network connection. Examples include, but are not limited to, wired interfaces such as Ethernet, USB, IEEE 1394, and/or wireless interfaces such as IEEE 802.11, Bluetooth, or radio interfaces for accessing cellular telephone networks (e.g., transceiver/antenna for accessing a CDMA, GSM, UMTS, or other mobile communications network).

I/O components 112 may be used to facilitate connection to devices such as a one or more displays, keyboards, mice, speakers, microphones, and/or other hardware used to input data or output data. Storage 114 represents nonvolatile storage such as magnetic, optical, or other storage media included in device 101.

System 100 further includes a touch surface 116, which is in this example integrated into device 101. Touch surface 116 represents any surface that is configured to sense tactile input of a user. One or more sensors 108 are configured to detect a touch in a touch area when an object contacts a touch surface and provide appropriate data for use by processor 102. Any suitable number, type, or arrangement of sensors can be used. For example, resistive and/or capacitive sensors may be embedded in touch surface 116 and used to determine the location of a touch and other information, such as pressure. As another example, optical sensors with a view of the touch surface may be used to determine the touch position.

In this example, an actuator 118 in communication with processor 102 is coupled to touch surface 116. In some embodiments, actuator 118 is configured to output a haptic effect varying a coefficient of friction of the touch surface in response to a haptic signal. Additionally or alternatively, actuator 118 may provide vibrotactile haptic effects that move the touch surface in a controlled manner. Some haptic effects may utilize an actuator coupled to a housing of the device, and some haptic effects may use multiple actuators in sequence and/or in concert. For example, the coefficient of friction can be varied by vibrating the surface at different frequencies. Different combinations/sequences of variance can be used to simulate the feeling of a texture.

Although a single actuator 118 is shown here, embodiments may use multiple actuators of the same or different type to vary the coefficient of friction of the touch surface. For example, a piezoelectric actuator is used in some embodiments to displace some or all of touch surface 116 vertically and/or horizontally at ultrasonic frequencies, such as by using an actuator moving at frequencies greater than 20 kHz in some embodiments. In some embodiments, multiple actuators such as eccentric rotating mass motors and linear resonant actuators can be used alone or in concert to provide different textures and other haptic effects.

Turning to memory 104, exemplary program components 124, 126, and 128 are depicted to illustrate how a device can be configured in some embodiments to provide a variable-friction display. In this example, a detection module 124 configures processor 102 to monitor touch surface 116 via sensor(s) 108 to determine a position of a touch. For example, module 124 may sample sensor 108 in order to track the presence or absence of a touch and, if a touch is present, to track the location, path, velocity, acceleration, pressure and/or other characteristics of the touch over time.

Haptic effect determination module 126 represents a program component that analyzes data regarding touch characteristics to select a haptic effect to generate. Particularly, module 126 comprises code that determines, based on the location of the touch, a simulated feature of the touch surface to generate and code that selects one or more haptic effects to provide in order to simulate the feature. For example, some or all of the area of touch surface 116 may be mapped to a graphical user interface. Different haptic effects may be selected based on the location of a touch in order to simulate the presence of the feature by varying the friction of touch surface 116 so that the feature is felt when a corresponding representation of the feature is seen in the interface. However, haptic effects may be provided via touch surface 116 even if a corresponding element is not displayed in the interface (e.g., a haptic effect may be provided if a boundary in the interface is crossed, even if the boundary is not displayed).

Haptic effect generation module 128 represents programming that causes processor 102 to generate and transmit a haptic signal to actuator(s) 118 to generate the selected haptic effect at least when a touch is occurring. For example, generation module 128 may access stored waveforms or commands to send to actuator 118. As another example, haptic effect generation module 128 may receive a desired coefficient of friction and utilize signal processing algorithms to generate an appropriate signal to send to actuator(s) 118. As a further example, a desired texture may be indicated along with target coordinates for the texture and an appropriate waveform sent to one or more actuators to generate appropriate displacement of the surface (and/or other device components) to provide the texture. The feature may be simulated at least by varying a coefficient of friction of touch surface 116. Some embodiments may utilize multiple actuators in concert to simulate a feature. For instance, a variation in friction may be used to simulate crossing a boundary between simulated piano keys while a vibrotactile effect simulates the response of each key as it is pressed.

A touch surface may or may not overlay (or otherwise correspond to) a display, depending on the particular configuration of a computing system. In FIG. 1B, an external view of a computing system 100B is shown. Computing device 101 includes a touch-enabled display 116 that combines a touch surface and a display of the device. The touch surface may correspond to the display exterior or one or more layers of material above the actual display components.

FIG. 1C illustrates another example of a touch-enabled computing system 100C in which the touch surface does not overlay a display. In this example, a computing device 101 features a touch surface 116 which may be mapped to a graphical user interface provided in a display 122 that is included in computing system 120 interfaced to device 101. For example, computing device 101 may comprise a mouse, trackpad, or other device, while system 120 may comprise a desktop or laptop computer, set-top box (e.g., DVD player, DVR, cable television box), or another computing system. As another example, touch surface 116 and display 122 may be included in the same device, such as a touch-enabled trackpad in a laptop computer featuring display 122. Whether integrated with a display or otherwise, the depiction of planar touch surfaces in the examples herein is not meant to be limiting. Other embodiments include curved or irregular touch-enabled surfaces that are further configured to provide surface-based haptic effects.

FIGS. 2A-2B illustrate an example of simulating a feature using a surface-based haptic effect. FIG. 2A is a diagram illustrating an external view of a system 200 comprising a computing device 201 that features a touch-enabled display 202. FIG. 2B shows a cross-sectional view of device 201. Device 201 may be configured similarly to device 101 of FIG. 1A, though components such as the processor, memory, sensors, and the like are not shown in this view for purposes of clarity.

As can be seen in FIG. 2B, device 201 features a plurality of actuators 218 and an additional actuator 222. Actuator 218-1 may comprise an actuator configured to impart vertical force to display 202, while 218-2 may move display 202 laterally. In this example, the actuators are coupled directly to the display, but it should be understood that the actuators could be coupled to another touch surface, such as a layer of material on top of display 202. Additional actuator 222 may be coupled to a housing containing the components of device 201. In the examples of FIGS. 2A-2B, the area of display 202 corresponds to the touch area, though the principles could be applied to a touch surface completely separate from the display.

In one embodiment, actuators 218 each comprise a piezoelectric actuator, while additional actuator 222 comprises an eccentric rotating mass motor, a linear resonant actuator, or another piezoelectric actuator. Actuator 222 can be configured to provide a vibrotactile haptic effect in response to a haptic signal from the processor. The vibrotactile haptic effect can be utilized in conjunction with surface-based haptic effects and/or for other purposes.

In some embodiments, either or both actuators 218-1 and 218-2 can comprise an actuator other than a piezoelectric actuator. Any of the actuators can comprise a piezoelectric actuator, an electromagnetic actuator, an electroactive polymer, a shape memory alloy, a flexible composite piezo actuator (e.g. an actuator comprising a flexible material), electrostatic, and/or magnetostrictive actuators, for example. Additionally, a single actuator 222 is shown, although multiple other actuators can be coupled to the housing of device 201 and/or other actuators 222 may be coupled elsewhere. Device 201 may feature multiple actuators 218-1/218-2 coupled to the touch surface at different locations, as well.

Turning back to FIG. 2A, as shown at 220, a finger moves to encounter a simulated feature 230. In this example, a haptic effect is selected for output based on the position of a touch represented by movement of finger 226 downward to position 228. Particularly, as can be seen in FIG. 4B, actuators 218-1, 218-2, and/or 222 are provided with appropriate haptic signals to provide surface-based haptic feedback as indicated at 232, 234, and 236. The different cross-hatching is intended to represent different "feel" of the touch surface due to the actuators. For instance, 232, 234, and 236 can represent variations in the texture or coefficient of friction of the touch surface that generate the desired haptic effect. In one embodiment, the feeling of a box can be simulated by having a first area 232 of higher friction followed by a second area 234 of lower friction and a third area 236 of higher friction.

Figure 3A:
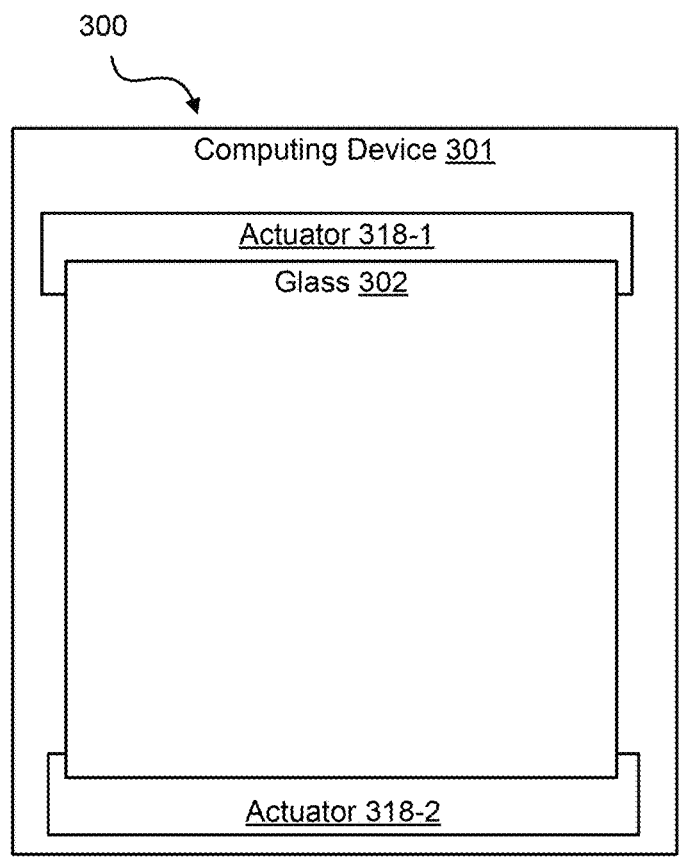
FIGS. 3A-3B depict an illustrative hardware architecture for varying the coefficient of friction of a surface.
Figure 3B:
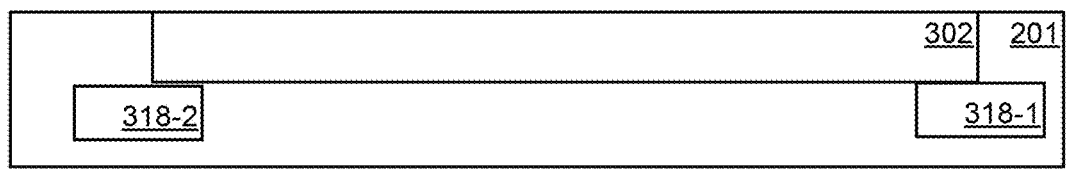

FIGS. 3A-3B depict an illustrative hardware architecture for varying the coefficient of friction of a surface. In this example, the touch surface comprises glass panel 302, although another transparent material (or non-transparent) material could be used. For instance, rather than glass, a touchpad (i.e. touch-sensitive device) could be used. A pair of piezoelectric benders 318-1 and 318-2 are bonded to the glass. Use of glass or another transparent material along with free space between the piezoelectric benders can allow for use of a display (not shown) beneath the glass. In some embodiments, the piezoelectric benders can be commanded to reduce the static coefficient of friction of glass 302 by 42%. Some embodiments utilize a bipolar pulse width modulated signal at 24 kHz, with varying amplitude used to vary the coefficient of friction. As an example, voltage can vary between −80 and +80 Volts at a frequency above 20 kHz, with friction variation from 0 to 60% depending on voltage magnitude (or PWM magnitude to produce the voltage magnitude). These example voltage, frequency, and variation ranges are for purposes of example only and are not intended to be limiting.

Figure 4A:
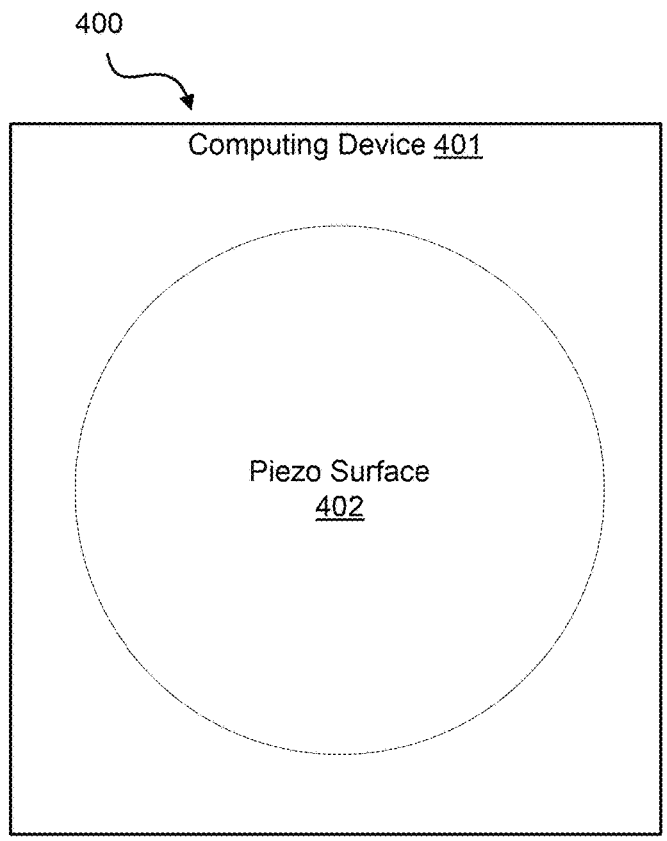
FIGS. 4A-4B depict another illustrative hardware architecture for varying the coefficient of friction of a surface.
Figure 4B:
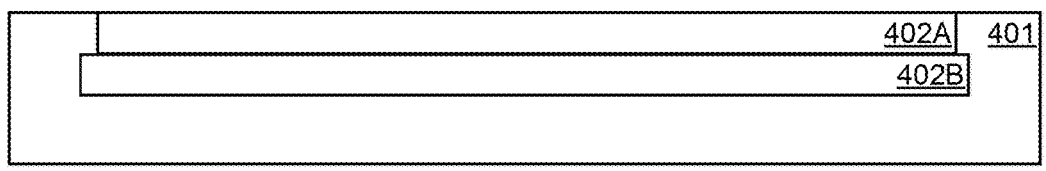

FIGS. 4A-4B depict another illustrative hardware architecture 400 for varying the coefficient of friction of a surface. In this example, a piezo buzzer presents a piezo surface 402 as part of computing device 401. For instance, one embodiment includes a 0.6 mm thick buzzer with a 25 mm diameter. As can be seen in FIG. 4B, the buzzer comprises a layer of piezoceramic material 402A and a metal disk 402B; in this embodiment, both are 0.3 mm thick. The static coefficient of friction may be reduced up to 88% from the original friction value when the buzzer is not activated. In this example, the surface is shown as round, although the principle could be applied to other shapes/surfaces.

Figure 5:
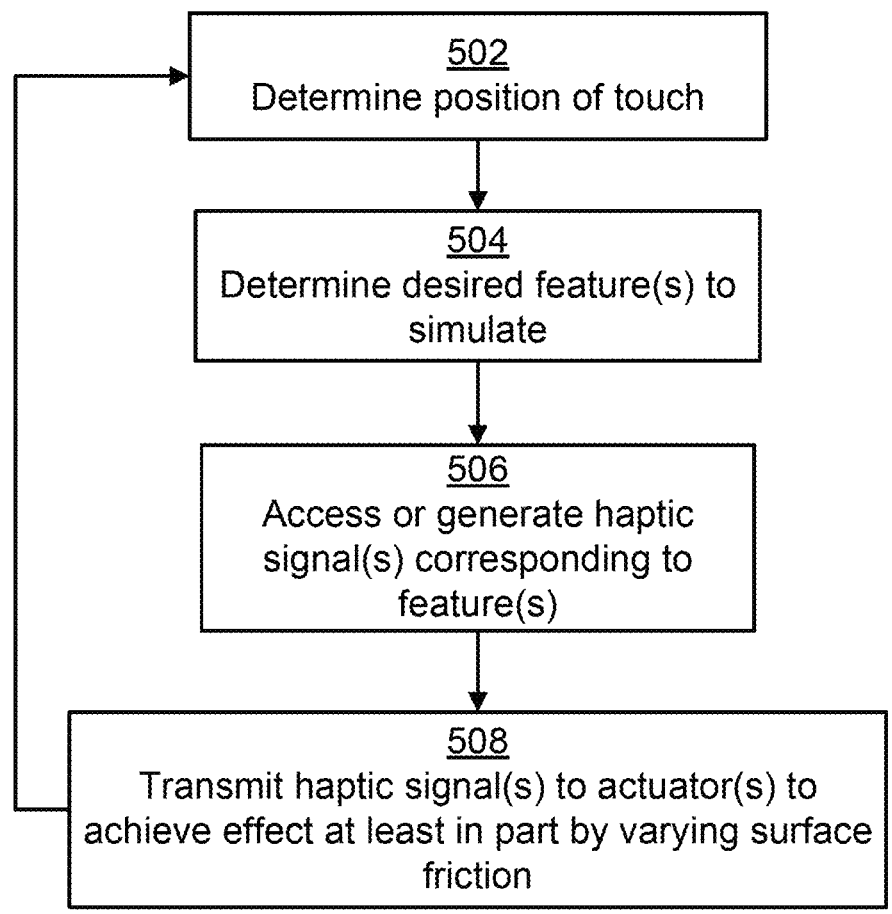
FIG. 5 is a flowchart showing an exemplary method for providing a simulated feature by using surface-based haptic effects.

Illustrative Methods for Simulating Features by Providing Surface-Based Haptic Effects FIG. 5 is a flowchart showing an illustrative method 500 for providing an interface with surface-based haptic effects. Block 502 represents determining a position of a touch in a touch area. For example, a processor may utilize one or more sensors embedded in or viewing a touch-enabled display or surface to track a position of a touch on the surface. Based on the current and/or past position of the touch, a present position or predicted position can be determined. As an example, a touch position may be provided in pixel coordinates or another coordinate system for the touch area. If velocity/acceleration is determined, the touch position may be associated with a vector or other information pertaining to position and motion of the touch.

Block 504 represents determining one or more desired features to simulate. In some embodiments, the computing system may simply determine whether or not the touch occurs at a location at which the actuator(s) are to be driven, with the desired feature and haptic signals determined in real time. However, in additional embodiments, the current pixel location and/or a projected pixel location for the touch based on a velocity of the touch can be compared to a bitmap specifying desired haptic effects for various pixel positions. Based on the desired haptic effect(s), suitable haptic signals can be accessed/generated to provide the output specified in the bitmap.

As another example, a current or projected location of a touch can be compared to data identifying the location of graphical user interface (GUI) features such as controls, textual content, boundaries, and the like. Then, if a GUI feature is identified at the location, data associating one or more haptic effects to the feature can be accessed. For instance, a processor may track the location of a touch and determine the touch is at or approaching a position in the touch area mapped to a particular control (e.g., a button) in the graphical user interface. The processor can then consult a listing of interface elements to determine a haptic effect (e.g., a texture, a friction variation) associated with the button and, based on the haptic effect, take further actions to generate the haptic effect.

As a further example, the feature may comprise a texture associated with the current or projected location. For instance, a portion of the touch area may be identified as having a particular texture, such as "fur." When the touch is determined to be at the portion, the computing device can determine that the "fur" feature is desired.

Block 506 represents accessing or generating one or more haptic signals to generate the selected haptic effect(s). For example, a processor may access drive signals stored in memory and associated with particular haptic effects. As another example, a signal may be generated by accessing a stored algorithm and inputting parameters associated with an effect. For example, an algorithm may output data for use in generating a drive signal based on amplitude and frequency parameters. As another example, a haptic signal may comprise data sent to an actuator to be decoded by the actuator. For instance, the actuator may itself respond to commands specifying parameters such as amplitude and frequency.

Block 508 represents transmitting the haptic signal to the actuator(s) to generate the desired effect(s). For instance, if an analog drive signal is to be provided, a processor can utilize an onboard D/A converter to create the signal. If a digital command is provided to the actuator, an appropriate message can be generated by an I/O bus of the processor, with the actuator itself including sufficient processing capability to provide the desired output. The haptic effect may be felt at the point of the touch and/or elsewhere.

In some embodiments, a baseline haptic signal may be sent to the actuator(s) to generate an ambient haptic effect even in the absence of a selected haptic effect in order to enhance the range of potential effects the device can produce. Thus, transmitting a haptic signal may comprise sending a stop, command, a zero or minimal signal to the actuator, or another suitable signal to the actuator to reduce intensity in order to the effect of the actuator and thus increase the friction, such as increasing to a level near or at the coefficient of friction for the touch surface when static.

As an example, use of certain actuators, such as piezoelectric actuators, may allow for reduction in the coefficient of friction of a touch surface but not an increase in the coefficient of friction. To provide a range of options, a baseline signal may be provided so that the "ordinary" friction level of the touch surface is below the coefficient of friction the touch surface would have when static. Accordingly, haptic effects may be defined with respect to the baseline, rather than static, value. If maximum friction is desired, a "zero" signal may be sent to the piezoelectric actuator to stop movement of the surface.

Figure 6A:
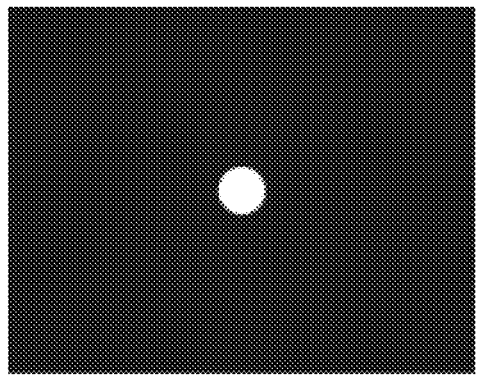
FIGS. 6A-6D each depict an illustrative simulated feature.
Figure 6B:
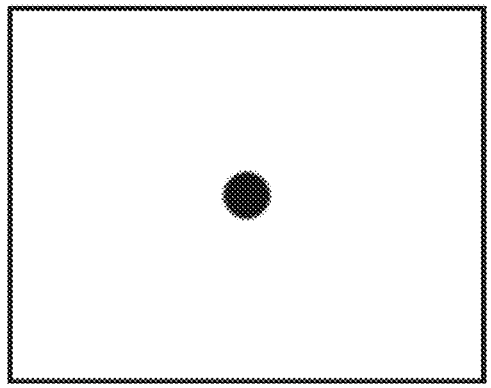

FIGS. 6A-6D each depict an illustrative simulated feature. FIG. 6A shows a simplified example in which the white area represents an area where piezoelectric or other actuators will be activated, such as by using a non-zero voltage PWM signal. For example, the white area may correspond to a virtual button in the middle of a touch pad, where a user's finger (or another object in contact with a surface) will encounter a lower friction value. FIG. 6B represents an inverses situation—the finger/object may navigate freely in the white area, but may be slowed or stopped at the high friction (black) area. This may, for example, allow a user to more easily locate a button or other location in the touch area.

Figure 6C:
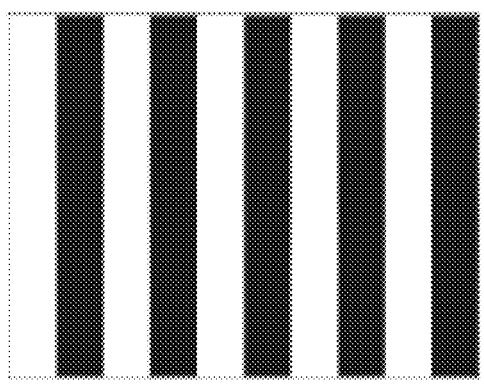

FIG. 6C illustrates a simulated feature comprising a plurality of grooves. As a user's finger or another object moves horizontally across the stripes, the finger/object will encounter increasing and decreasing friction that is perceived as a series of grooves.

As was noted above, a computing system comprising a touch surface configured to provide surface-based haptic effects may determine effects and signals in real time. For example, for any of FIGS. 6A-6D, the system may first determine if the touch position is inside the circle and, if so, provide a suitable output value (FIG. 6A) or cease output (FIG. 6B). Similarly, the system may provide the feature of FIG. 6C by determining if the touch occurs in an area with desired high-friction and, if so, drive the actuator(s).

Figure 6D:
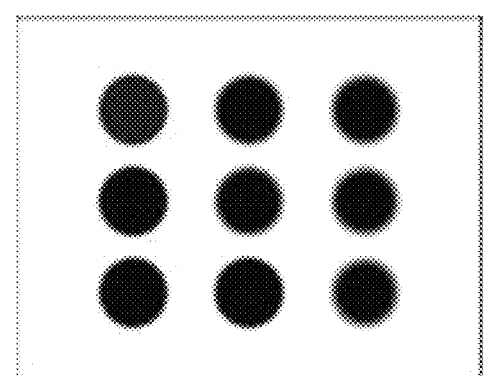

FIG. 6D presents a more complex pattern. For instance, the pattern in FIG. 6D may correspond to desired features associated with an array of keys, such as an array of mobile phone keys, a simulated keyboard, or other controls. Although real time rendering could be used for any of FIGS. 6A-6D, more complex logic may be needed to render each specific circle/button in the pattern. These and even more arbitrary patters may increase the complexity of programming and computation time. Thus, in some embodiments, the surface-based haptic effects can be determined ahead of time and stored in a file. At runtime, the file can be accessed based on a touch position to allow for faster determination and generation of appropriate haptic signals. For FIG. 6D, such a file could include data to drive the actuators to provide a first haptic effect (e.g., high friction) when the touch position is mapped to the circles, and the file could include data to drive the actuators to provide a second effect (e.g., low friction) when the touch position is mapped to a location outside the circles.

Figure 7:
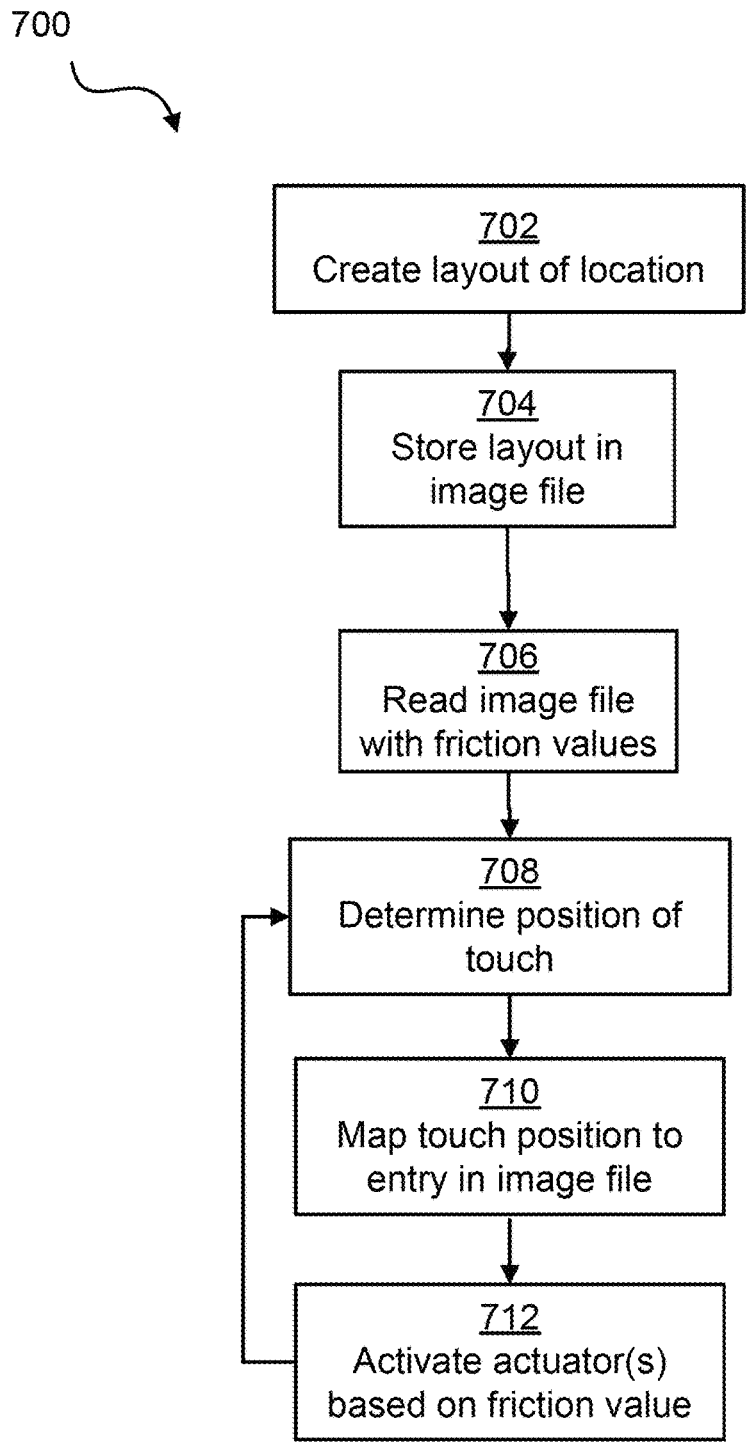
FIG. 7 is a flowchart showing an exemplary method for providing a simulated feature by using a reference file.
Figure 8:
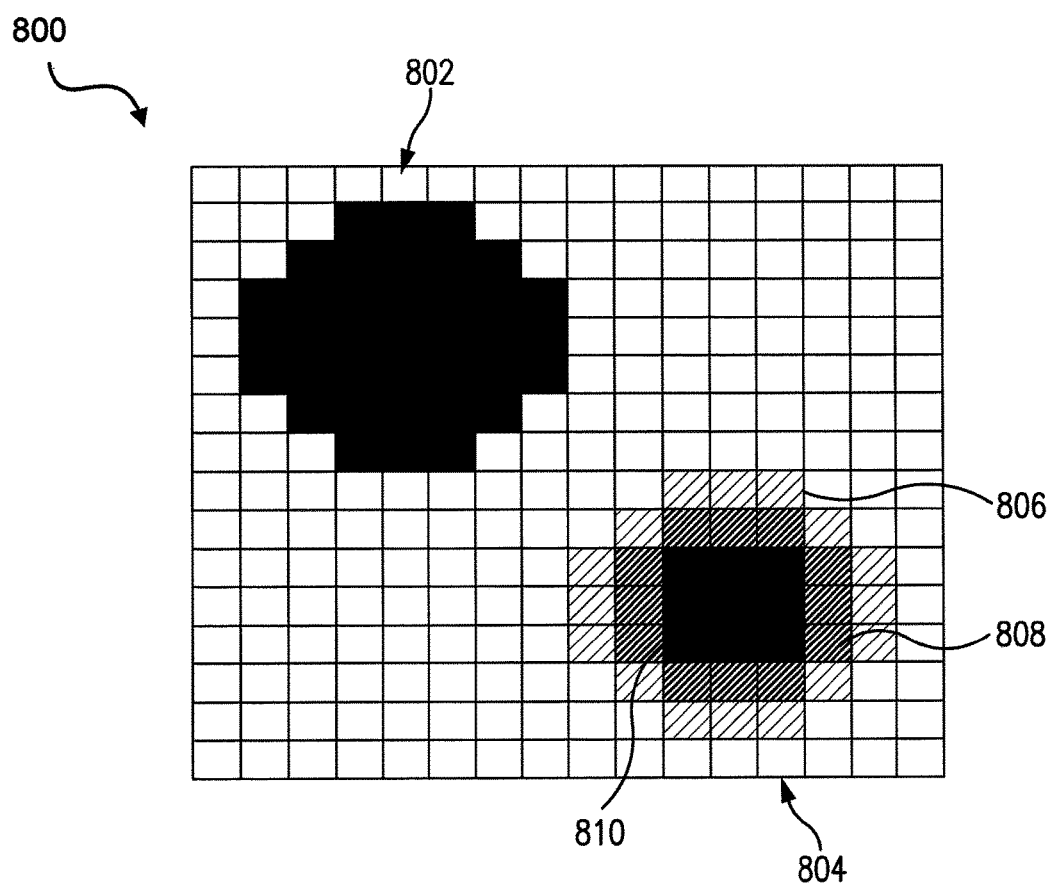
FIG. 8 is an example of a reference file including data for simulating features of a touch surface.

FIG. 7 is a flowchart showing an exemplary method 700 for providing a simulated feature by creating and using a reference file. FIG. 8 shows an example of a reference file comprising an array of pixels. Blocks 702 and 704 represent preprocessing—activities that occur prior to use of a reference file to determine a haptic effect. In this example, a single reference file is used to determine friction values. In practice, a reference file may provide other data for use in generating haptic effects in addition to or instead of generating variances in friction. Additionally, a "reference file" may comprise multiple files used together.

Block 702 represents creating a layout of a location and block 704 represents storing the layout in an image file, such as an array of pixels in a bitmap or other image file. For example, arbitrary shapes may be "drawn" in order to specify desired friction values. In FIG. 8, white pixels are shown to indicate where no friction adjustment is intended, while shaded pixels indicate a value of a desired coefficient of friction or even a value usable to drive an actuator (e.g., a desired PWM voltage level, frequency, etc.). Alternatively, white pixels may indicate maximum drive, while various degrees of shading indicate lower drive values, with black representing zero drive. In an embodiment, white pixels and black pixels only are used, with the colors corresponding to on/off states of the actuators of a device.

In this example, different degrees of shading are represented by cross-hatching. In practice, each pixel may comprise multiple values (e.g., each pixel may have an RGB value), with the multiple values providing different data, such as drive levels for different actuators and the like. Additionally, a reference file may include multiple layers for specifying various parameters for each pixel position. This example shows a relatively small number of pixels; in practice, the array may comprise thousands or millions of pixels.

Shape 802 comprises a solid circle. Shape 804 also comprises a circle, but is provided to indicate that the image file can be used to specify multiple levels of friction (or other haptic effects). For example, transition areas between low and high (or high and low) friction can be provided through use of different shadings, such as the transition from low shading 806 to moderate shading 808 and finally to full shading 810. The transition may correspond to an increasing friction level (or decreasing friction level) as the center of circle 804 is approached.

In some embodiments, transitions can be specified when the layout file is created. In some instances, the transitions may be used to provide offsets of friction values with respect to a visual layout. For example, returning briefly to FIG. 6B, a solid shape such as the circle of FIG. 6B may be provided in a graphical user interface. The corresponding friction image may more closely resemble a scaled version of circle 804 of FIG. 8, providing "fuzzy" edges to represent a transition effect. One method of generating such an image could comprise using an image of an interface and applying a blur or other filter, with the pixel levels adjusted after blurring to provide a desired response when used to generate/select haptic signals.

Returning to FIG. 7 and method 700, once a reference file is created, it can be loaded into memory and read as shown at block 706 to determine friction values. For example, some or all of the pixel array may be maintained in working memory of a processor carrying out a position detection and feature simulation routine. In an embodiment, the pixel array is distributed alongside a corresponding image of a graphical user interface. In additional embodiments, the pixel array is a layer or component of the graphical user interface image, and in further embodiments the array is a separate file not associated with a graphical user interface.

Block 708 represents determining a position of a touch. For example, a sensor may provide data used to determine a pixel position of a touch in an array of pixels mapped to a touch area. Non-pixel coordinates may be used in identifying the location of a touch, with appropriate transforms used during the mapping step below.

Block 710 represents mapping the touch position to an entry (or entries) in the image file. For instance, the touch area may be mapped directly so that a touch at pixel (x,y)=(10, 12) results in accessing one or more pixel values in the image at image (x,y)=(10,12). However, more complex mappings may be used. For example, a touch position and velocity may be used to map a pixel value in the touch area to a different pixel value in the image file. For instance, the size of the touch area and the size of the pixel array may differ, with a scaling factor used to map touch locations to pixel values.

Block 712 represents activating one or more actuators to provide a surface-based haptic effect based at least in part on data from the image file. For instance, the pixel value in the image file may be mapped to a desired coefficient of friction. A device carrying out method 700 may determine, based on the pixel position and the desired coefficient of friction, a suitable signal or signals to send to one or more actuators to generate the desired coefficient of friction. As another example, the pixel value may indicate a drive signal more directly, such as a voltage/amplitude/frequency value or offset for a PWM signal to be sent to a piezoelectric actuator. Data of the array may also be configured for use in generating a drive signal for another type of actuator.

As a more complex example, each pixel address may be associated with three intensity values (i.e., RGB). Each of the three intensity values can be associated with a signal intensity/frequency for a corresponding actuator in some embodiments. As another example, some values may specify intensity and others specify duration of operation for the same actuator. As a further example, different pixel intensity values may be correlated to different desired textures or components used to drive actuators to simulate a single texture.

Method 700 may determine touch locations mapped to multiple pixels in the image file. For example, a large touch may correspond to a range of pixel addresses in the image file. Friction or other values from the range of pixel addresses may be considered together, or analysis may be made to "pinpoint" the touch location and use a value from a corresponding single pixel address.

In some embodiments, a computing device featuring a touch surface with surface-based haptic effects can output different surface-based haptic effects based on sequences of inputs. Thus, the simulated features of the touch surface can vary based on a state of a device associated with the surface. In some embodiments, this can be implemented using a reference file with multiple layers; each layer can correspond to a particular state. The states can be changed based on various input conditions, for instance.

For example, a touch surface may be configured to act as a keypad, such as on a mobile device. The keypad may feature three rows of keys corresponding to numbers 1-9 and a fourth row with "0," "*", and "#" keys. For an initial state, the touch surface may be configured to provide a centering feature, such as a higher friction level at the "5" key than in the remainder of the layout.

The computing device can be configured to change the state of the touch surface in response to user input based on tracking the input relative to the touch-sensitive area. For example, once the system determines that the user has found the "5" key, e.g. by detecting touching, hovering, or other activity indicating that the key has been located (but not necessarily selected), the surface-based effects can be provided based on a different state. If a multi-layer reference file is used, for example, a different layer can be loaded into memory. In the second state, for instance, boundaries between keys can be provided so that a user can proceed from the center to a desired key without the need for visual feedback (although, of course, visual, auditory, or other feedback can be provided alongside any embodiments of the present subject matter).

Other Illustrative Embodiments of Simulated Features

Surface-based haptic effects may take any suitable form, including, but not limited to, effects based on varying the coefficient of friction of the touch surface. As another example, vibrotactile effects may be used, such as vibrations or series of vibrations. Vibrotactile effects and/or variations in friction may be used to simulate the feeling of distinct features, such as boundaries or obstacles. For example, a boundary or edge may be simulated by an increase in friction, with the friction decreasing if the boundary is crossed (in some instances) as noted above.

Features simulated using the touch surface can comprise any discontinuity, including, but not limited to, simulated gaps, protrusions, obstacles, and the like. Additionally or alternatively, a simulated feature can comprise an area with a changed coefficient of friction. For example, some haptic effects may comprise variations in the friction of the touch surface—some portions may be rendered "slicker" or "rougher" than others. In some embodiments, a simulated feature includes a texture simulated by varying the coefficient of friction of the surface in a controlled manner.

Additional detail regarding generation and use of textures can be found in U.S. patent application Ser. Nos. 12/697,010, 12/697,042, and 12/697,037, referenced above and entitled "Systems and Methods for a Texture Engine," "Systems and Methods for Using Multiple Actuators to Realize Textures," and "Systems and Methods for Using Textures in Graphical User Interface Widgets," respectively. For instance, patterns of differing friction or patterns of vibration may be provided to mimic the feeling of textures such as brick, rocks, sand, grass, fur, various fabric types, water, molasses, and other fluids, leather, wood, ice, lizard skin, metals, and other texture patterns. Other textures not analogous to real-world textures may also be used, such as high-magnitude vibrotactile or other feedback when a "danger" texture is desired.

The informational content or meaning of surface-based haptic effects can vary in various embodiments. For example, effects may be used to identify particular portions of a touch surface mapped to areas in a graphical user interface, simulated keys or other controls, or may be provided for aesthetic or entertainment purposes (e.g., as part of a design and/or in a game). Effects may be provided for communication purposes as well. For example, Braille or other tactile-based communications methods can be facilitated.

General Considerations

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

Embodiments in accordance with aspects of the present subject matter can be implemented in digital electronic circuitry, in computer hardware, firmware, software, or in combinations of the preceding. In one embodiment, a computer may comprise a processor or processors. The processor comprises or has access to a computer-readable medium, such as a random access memory (RAM) coupled to the processor. The processor executes computer-executable program instructions stored in memory, such as executing one or more computer programs including a sensor sampling routine, a haptic effect selection routine, and suitable programming to produce signals to generate the selected haptic effects as noted above.

Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example tangible computer-readable media, that may store instructions that, when executed by the processor, can cause the processor to perform the steps described herein as carried out, or assisted, by a processor. Embodiments of computer-readable media may comprise, but are not limited to, all electronic, optical, magnetic, or other storage devices capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. Also, various other devices may include computer-readable media, such as a router, private or public network, or other transmission device. The processor, and the processing, described may be in one or more structures, and may be dispersed through one or more structures. The processor may comprise code for carrying out one or more of the methods (or parts of methods) described herein.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed:

1. A system comprising:
   a display comprising a plurality of pixels;
   a sensor configured to detect a touch in a touch area when an object contacts a touch surface;
   an actuator coupled to the touch surface, the actuator configured to receive a haptic signal and output a haptic effect; and
   a processor in communication with the actuator and sensor, the processor configured to:
   determine a position of the touch based on data from the sensor,
   receive haptic parameters associated with a location on the touch surface;
   map the position of the touch to the location on the touch surface;
   determine a haptic effect to simulate a presence of a feature based in part on a color and a degree of shading at the location on the touch surface, wherein the haptic effect is configured to vary a coefficient of friction on the touch surface at the position of the touch, wherein the degree of shading corresponds to a level of the coefficient of friction; and
   transmit a haptic signal to generate the haptic effect using the actuator.

2. The system set forth in claim 1, wherein the feature further comprises a texture at or near the determined position of the touch.

3. The system set forth in claim 1, wherein the feature comprises a boundary between a first region and a second region in a graphical user interface displayed in the display.

4. The system set forth in claim 3, wherein the boundary comprises a boundary between two simulated keys of a keyboard.

5. The system set forth in claim 1, wherein determining the haptic effect further comprises:
   accessing a mapping file that maps each of a plurality of positions to a respective haptic effect; and
   identifying a haptic effect mapped to a selected position, the selected position selected based on the determined position of the touch.

6. The system set forth in claim 5, wherein the selected position is the position of the touch.

7. The system set forth in claim 5, wherein the selected position is determined based on the position of the touch and a velocity of the touch.

8. The system set forth in claim 1, wherein the actuator is configured to displace the touch surface vertically, laterally, or vertically and laterally at an ultrasonic frequency.

9. The system set forth in claim 8, wherein the actuator comprises at least one of:
   a piezoelectric actuator;
   an electromagnetic actuator;
   an electroactive polymer;
   a shape memory alloy; or
   a composite.

10. The system set forth in claim 1, wherein the processor is further configured to determine a pressure of the touch based on data from the sensor, wherein the haptic effect is selected based at least in part on the pressure of the touch.

11. A method, comprising:
    displaying an image in a display area comprising a plurality of pixels;
    detecting a touch in a touch area associated with the display area in response to contact between an object and a touch surface;
    determining a position of the touch;
    receiving haptic parameters associated with a location on the touch surface;
    mapping the position of the touch to a location on the touch surface;
    determining a haptic effect to simulate a presence of a feature based in part on a color and a degree of shading at the location on the touch surface, wherein the haptic effect is configured to vary a coefficient of friction on the touch surface at the position of the touch, wherein the degree of shading corresponds to a level of the coefficient of friction; and
    generating the haptic effect by providing a haptic signal to at least one actuator coupled to the touch surface.

12. The method set forth in claim 11, wherein the feature further comprises a texture at or near the determined position of the touch.

13. The method set forth in claim 11, wherein the feature comprises a boundary between a first region displayed in a display area and a second region in the display area, the display area mapped to the touch area.

14. The method set forth in claim 13, wherein the boundary comprises a boundary between two keys of a keyboard depicted in the display area.

15. The method set forth in claim 11, wherein selecting a haptic effect comprises:
    accessing a mapping file that maps each of a plurality of positions to a respective haptic effect; and
    identifying a haptic effect mapped to a selected position, the selected position selected based on the determined position of the touch.

16. The method set forth in claim 15, wherein the selected position is the position of the touch or is determined based on the position of the touch and a velocity of the touch.

17. The method set forth in claim 11, wherein the actuator is configured to displace the touch surface vertically, laterally, or vertically and laterally at an ultrasonic frequency.

18. The method set forth in claim 17, wherein the actuator comprises at least one of:
    a piezoelectric actuator;
    an electromagnetic actuator;
    an electroactive polymer;
    a shape memory alloy; or
    a composite.

19. A non-transitory computer-readable medium embodying program code, which when executed by a processor is configured to cause the processor to:
    display an image in a display area comprising a plurality of pixels;
    track a position of a touch on a touch surface associated with the display area;
    receive haptic parameters associated with a location on the touch surface;
    map the position of the touch to a location on the touch surface;
    determine a haptic effect to simulate a presence of a feature based in part on a color and a degree of shading at the location on the touch surface, wherein the haptic effect is configured to vary a coefficient of friction on the touch surface at the position of the touch, wherein the degree of shading corresponds to a level of the coefficient of friction; and transmit a haptic signal to at least one actuator to generate the feature by varying a coefficient of friction of the touch surface.

20. The system of claim 1, wherein varying the coefficient of friction of the touch surface comprises increasing the coefficient of friction of the touch surface.

21. The method of claim 11, wherein varying the coefficient of friction of the touch surface comprises increasing the coefficient of friction of the touch surface.

22. The non-transitory computer readable medium of claim 19, wherein varying the coefficient of friction of the touch surface comprises increasing the coefficient of friction of the touch surface.

* * * * *